United States Patent [19]
Wu et al.

[11] Patent Number: 5,609,293
[45] Date of Patent: Mar. 11, 1997

[54] LINED AND COATED CORRUGATED PAPERBOARD PACKAGE SYSTEMS FOR MODIFIED ATMOSPHERE PACKAGING OF FRESH FRUITS AND VEGETABLES

[75] Inventors: Chiu H. Wu, Vancouver, Canada; Juhani I. Oikarinen, Lahti, Finland; William D. Powrie, North Vancouver, Canada; Hannu K. Tykkaelae, Helsinki, Finland

[73] Assignee: The University of British Columbia, Vancouver, Canada

[21] Appl. No.: 325,376

[22] PCT Filed: Apr. 20, 1993

[86] PCT No.: PCT/CA93/00168

§ 371 Date: Jan. 19, 1995

§ 102(e) Date: Jan. 19, 1995

[87] PCT Pub. No.: WO93/22138

PCT Pub. Date: Nov. 11, 1993

[30] Foreign Application Priority Data

Apr. 27, 1992 [CA] Canada ................................. 2067256

[51] Int. Cl.$^6$ .................................................. B65D 81/24
[52] U.S. Cl. ...................... 229/3.5 R; 229/3.1; 229/120; 229/939; 428/34.2; 428/182
[58] Field of Search .................................. 229/3.1, 3.5 R, 229/120, 939; 156/205, 210, 462; 428/34.2, 182; 426/118, 127, 385, 404

[56] References Cited

U.S. PATENT DOCUMENTS

| | | |
|---|---|---|
| 3,308,006 | 3/1967 | Kresse et al. ............................ 229/3.1 |
| 3,379,537 | 4/1968 | Brandt et al. ........................... 426/127 |
| 3,399,819 | 9/1968 | Rennie et al. ........................... 229/3.1 |
| 3,450,542 | 6/1969 | Badran . |
| 3,450,544 | 6/1969 | Badran et al. . |
| 3,630,759 | 12/1971 | Rumberger . |
| 3,723,222 | 3/1973 | Kurita et al. ............................. 156/210 |
| 3,798,333 | 3/1974 | Cummin et al. . |
| 3,811,987 | 5/1974 | Wilkinson et al. ...................... 156/210 |
| 4,358,498 | 11/1982 | Chavannes ............................... 156/205 |
| 4,489,120 | 12/1984 | Hollinger, Jr. .......................... 428/182 |
| 4,500,381 | 2/1985 | Nordstrom .............................. 156/205 |
| 4,515,266 | 5/1985 | Myers ..................................... 229/120 |

FOREIGN PATENT DOCUMENTS

| | | | |
|---|---|---|---|
| 737763 | 7/1966 | Canada .................................. 229/3.1 |
| 332742 | 9/1989 | European Pat. Off. . |
| 2104796 | 8/1972 | Germany ................................ 229/939 |
| 14095 | 2/1978 | Japan ..................................... 428/182 |
| 4214336 | 8/1992 | Japan ..................................... 428/182 |
| 7101236 | 8/1972 | Netherlands . |
| 1296040 | 11/1972 | United Kingdom . |
| 1592880 | 7/1981 | United Kingdom . |
| 2096052 | 10/1982 | United Kingdom . |

OTHER PUBLICATIONS

R. G. Tomkins, "The Conditions Produced in Film Packages by Fresh Fruits & Vegetables and the Effect of These Conditions on Storage Life", J. appl. Bact., 1962, 25(2), 290–307.

C. A. Eaves, "A Modified–Atmosphere System for Packages of Stored Fruit", 1960, J. Hort. Sci., vol. 35, 110–117.

Primary Examiner—Gary E. Elkins
Attorney, Agent, or Firm—Oyen Wiggs Green & Mutala

[57] ABSTRACT

This invention relates to the design, construction and use of lined or coated corrugated paperboard package systems (e.g. boxes, cartons) for prolonging the storage life of fresh fruits and vegetables under modified atmospheres (MA) in the headspaces of the closed package systems. The plastic-paperboard construction comprises a first layer of polymeric film, a second layer of kraft paper adjacent the first layer, a kraft paper corrugated flute adjacent the second layer and a fourth layer of kraft paper adjacent the flute.

14 Claims, 6 Drawing Sheets

5,609,293

1

LINED AND COATED CORRUGATED PAPERBOARD PACKAGE SYSTEMS FOR MODIFIED ATMOSPHERE PACKAGING OF FRESH FRUITS AND VEGETABLES

FIELD OF THE INVENTION

This invention relates to the design, construction and use of lined or coated corrugated paperboard package systems (e.g. boxes, cartons) for prolonging the storage life of fresh fruits and vegetables under modified atmospheres (MA) in the headspaces of the closed package systems.

BACKGROUND OF THE INVENTION

The fresh packed quality attributes of fresh fruits and vegetables must be maintained as much as possible for as long as possible to ensure consumer acceptability. Quality deterioration of horticultural produce comes about through water loss for the tissue. Methods of inhibiting the deteriorative enzyme reactions, and the growth of yeasts, molds and bacteria involve the reduction of the produce temperature to between 1° to 12° C., and the creation of low $O_2$/high $CO_2$ modified atmospheres around the produce. Water in fruits and vegetables can be lost readily under low relative humidity conditions with the consequence of skin wrinkling, wilting and reduction in crispness. The rate of water loss from produce can be restricted by storing the produce in closed package systems consisting of walls with low moisture permeability.

GB-A-2 096 052, Lin Pac Containers Limited, discloses corrugated board which is designed principally for water resistance. There is no disclosure in the specification that is directed to regulating gas transmission rates through the board. However, the construction of the corrugated board is relevant. The corrugated board is constructed of two outer facer layers which are laminates comprising a first layer and a second layer, with a plastic intermediate layer. The centre of the board is corrugated kraft fluting. The first outermost layer can be greaseproof paper. The intermediate plastics layer can be polyethylene.

GB-1-1 592 880, Unilever Limited, discloses a moisture resistant composite material comprising cardboard, paperboard, or similar foldable board material. The objective is to provide a moisture resistant composite material useful for constructing cartons for packaging moisture sensitive materials. The composite material comprises a first layer of board material to form a facing layer, a second layer of kraft paper which is corrugated and attached to the first layer and a third layer of board material which is attached to the second layer. The third layer can be laminate of two sheets of board material (kraft) with a thermoplastic moisture barrier therebetween. At line 40 of page 1, it is stated that the thermoplastic moisture barrier may be polyethylene. There is no mention in this patent of controlling oxygen and carbon dioxide transmission rates through the walls of the moisture resistant composite material.

EP-A-0 332 742, Nekoosa Packaging Corporation, discloses a corrugated paperboard construction which includes a layer of plastic film of approximately 1–3 ml thickness. The thermoplastic co-extruded polymer film can be high density polyethylene, polypropylene, PET. The construction can be used in a single wall or multi-wall corrugated paperboard container having good moisture vapour transmission resistance. The containers are suitable for packaging food and chemical products. Again, this patent discloses paperboard constructions which include a layer of plastic

2 film. However, there does not appear to be any disclosure of gas transmission rates, the principal objective being to control moisture vapour transmission.

GB-A-1 296 040, Owens-Illinois, Inc., discloses a paperboard container having built-in water resistance. There is no disclosure of gas transmission rates. However, FIG. 2 illustrates a paperboard construction which comprises an outer liner board 44, a corrugated kraft fluting 42, and an inner linear board 34, which is a laminate of a kraft liner board 26, an intermediate layer of thermoplastic film 22, and an inner layer of bag stock 20. As with the other patents discussed, this patent also discloses a paperboard construction which includes a combination of kraft paper, corrugated paper, and plastic film.

SUMMARY OF THE INVENTION

This invention relates to the design, construction and use of lined or coated corrugated paperboard package systems (e.g. boxes, cartons) for prolonging the storage life of fresh fruits and vegetables under modified atmospheres (MA) in the headspaces of the closed package systems. In particular, the invention is concerned with the placement of various types of gas-permeable linings or coatings on the inside surface of corrugated paperboard, and with the design of die-cut patterns of the lined or coated corrugated paper boards to render the folded, sealed MA packages airtight (no air holes) and stackable. Further, the folded, sealed MA package systems possess external paperboard spacers (two at each end) to create air spaces at the ends of stacked MA package systems to enhance internal/external gas exchange. Further, the external spacers being perpendicular pillar-like extensions from the body of the closed, sealed MA package system act to strengthen the MA package system, to resist crushing and collapse of a package system under pressure from top-stacked package systems.

The invention is directed to a plastic-paperboard construction which may be comprised of:

(1) a sandwich-type plastic-paperboard complexity with the following layers: (a) a first layer of polymeric film; (b) a second layer of kraft paper adjacent the first layer; (c) a third layer of kraft paper corrugated flute adjacent the second layer; and (d) a fourth layer of kraft paper adjacent the flute;

(2) a sandwich-type plastic-paperboard complexity with the following layers: (a) a first layer of kraft paper; (b) a second layer of polymeric film adjacent the first layer; (c) a third layer of kraft paper adjacent the second layer; (d) a draft paper corrugated flute adjacent the third layer; and (e) a fifth layer of kraft paper adjacent the flute.

(3) a sandwich-type plastic-paperboard complexity with the following layers: (a) a first layer of polymeric film; (b) a second layer of kraft paper adjacent the first layer; (c) a third layer of polymeric film adjacent the second layer; (d) a fourth layer of kraft paper adjacent the third layer; (e) a fifth layer of kraft paper corrugated flute adjacent the fourth layer; and (f) a sixth layer of kraft paper adjacent the fifth layer.

(4) a sandwich-type plastic-paperboard complexity with the following layers: (a) a plurality of polymer film layers; (b) a second layer of kraft paper adjacent the plurality of polymeric film layers; (c) a third layer of kraft paper corrugated flute adjacent the fourth layer; and (d) a fourth layer of kraft paper adjacent the third layer.

(5) a sandwich-type plastic-paperboard complexity with the following layers: (a) a first layer of kraft paper; (b) a second layer of kraft paper corrugated flute adjacent the first layer; (c) a third layer of kraft paper adjacent the second layer; (d) a fourth layer of kraft paper-polymeric film combination spot secured to the third layer.

The invention is directed to a modified atmosphere box or carton (20,22,24) for packaging and extending the freshness of fresh produce characterized by constructing the walls of the box or carton with a sandwich-type plastic-paperboard complexity (2) comprising in sequence from the interior to the exterior: (a) a first layer of polymeric film (14); (b) a second layer of kraft paper (4) adjacent the first layer (14); (c) a third layer of kraft paper corrugated flute (8) adjacent the second layer (4); and (d) a fourth layer of kraft paper (10) adjacent the third layer (8), said box or carton being sealed airtight at all intersections and joints, the walls of said box or carton having an oxygen permeability of about 800 to 28,000 $mL/m^2/24$ hr./$25°$ C.

BRIEF DESCRIPTION OF THE DRAWINGS

FIGS. 11a and 11b illustrate an isometric view of an erected die-cut package body, with a rectangular lid juxtapositioned above the body, while FIG. 11c illustrates an isometric view of the lid placed directly upon the erected package body, and the longitudinal flanges of the erected body folded upwardly and inwardly over the lid;

DETAILED DESCRIPTION OF THE PREFERRED EMBODIMENT

Figure 1:
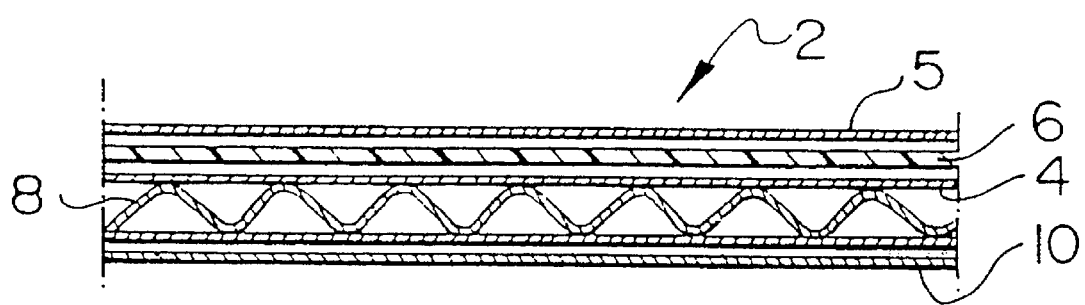
FIG. 1 illustrates a cross-sectional end view of an embodiment of the plastic/paper liner corrugated paperboard package material.

Storage life of fresh fruits and vegetable is dependent on storage temperature, gas composition around the produce and degree of physical abuse leading to bruises, abrasions and cuts. Storage and transportation of fruits and vegetable is facilitated by the packing of the produce in suitable package systems which provide features such as prolonging storage life, reducing physical abuse and lowering the rate of water loss of produce.

Corrugated paperboard boxes and cartons are used commercially for the storage and transportation of fresh fruits and vegetables for the following reasons:

1. Relatively low cost per unit volume;
2. Low thermal conductivity;
3. Impact absorbing ability to prevent produce bruising;
4. Ease of disposal at the receiving end; and
5. Moderate stacking strength.

Since corrugated paperboard has very high $O_2$ and $CO_2$ permeabilities, this material by itself would be unsuitable for the construction of MA package systems.

Polymeric plastic films have been found to be suitable materials for the construction of MA package systems because they have specific gas permeabilities, possess water vapour barrier properties, can be heat sealed and can be laminated to form polyfilm laminates. Polymeric plastic films have been used as materials for the construction of MA package systems which include:

1. Tray or double tray (rigid or semi-rigid) lidded with a plastic film;
2. Flexible plastic pouch (bag);
3. Plastic film overwrap of a tray;
4. Plastic bag(s)-in-a-plastic bag;
5. Plastic bag(s)-in-a-box (paperboard, styrofoam); and
7. Box(es)-in-a-plastic bag.

The selection of material for the construction of MAP systems depends on the following criteria:

1. Specific gas and water vapour permeabilities;
2. Compatability with food;
3. Reliable sealability;
4. Suitable heat transfer characteristics;
5. Anti-fog characteristics;
6. Physical abuse resistance;
7. Ease of opening package;
8. Machinability;
9. Recyclability; and
10. Cost effectiveness.

Many studies have been carried out on the MAP of fruits and vegetables with sealed polymeric, plastic film bags in a corrugated paperboard box. However, several disadvantages of using a bag-in-a-box are evident:

1. Loss of headspace around produce with the shrinkage of the bag under negative pressure created by respiratory $CO_2$ dissolution in produce tissue;
2. Extra handling of two packages, namely, the bag and the box;
3. The thickness of the bag film must be at least 0.152 cm (6 mil) to ensure bag durability during the handling, and thus high package cost and low gas permeability of the bag is unavoidable.

If polymeric plastic film were laminated to the inner surface of corrugated paperboard or if a liquid polymeric plastic coat were applied as a thin film on the inner surface of corrugated paperboard, then the above-mentioned disadvantages of the plastic bag-in-a-box could be absolved. The inventors are unaware of any patents or publications on the use of plastic paper lining or plastic coating or corrugated paperboard for the construction of MA package systems.

With the application of a gas-permeable barrier lining or coating onto the inner surface of corrugated paperboard, materials for the construction of MA package systems are made available. The lamination of thin polymeric plastic film with a specific gas-permeability to a highly-smooth inner surface of corrugated paperboard can be carried out to produce a durable, gas-permeable film-paper complexity. Further, a liquid, polymeric plastic can be spread as a coating onto the inner smooth surface of a corrugated paperboard in the form of a thin layer to produce a durable, gas-permeable plastic film-paper complexity.

If the inner surface of the corrugated paperboard is not highly smooth, but has fiber eruptions, the coating of a polymeric plastic film or liquid polymeric plastic on the paper surface will be uneven and will possess pinholes. Such imperfections in the polymeric plastic coating render the coated corrugated paperboard unsuitable for MA packaging because of the high rate of gas diffusion through the pinhole areas.

As an alternative to the coating of the inner surface of corrugated paperboard, coating of a separate highly-smooth sheet paper with either a polymeric plastic film or a liquid polymeric plastic can take place to form a plastic-paper lining to be spot laminated to the inner surface of corrugated paperboard.

The design of MA package systems must be based on the respiration rates at the required equilibrium $O_2$ and $CO_2$ levels, gas partial pressure differentials, inner surface area of the package system and gas permeability values of the package walls.

The single-piece and two-piece types of MA package systems were designed and constructed in such a manner that upon gluing, folding and pressing at glue points:

1. The inside surface of the package systems are smooth with no paperboard projections.
2. External paperboard spacers (two at each end) are formed to create air spaces at the ends of stacked MA package systems for enhancing internal/external gas exchange and to strengthen the package systems to resist stacking-pressure collapse.
3. The MA package systems are airtight, yet the walls have specific $O_2$ and $CO_2$ permeabilities.

The single-piece type MA package system is intended to be used on a continuous-flow produce line consisting of:

1. A gluing, folding and pressing operation to create an open box;
2. The filling of the open box with produce;
3. Gasification of produce headspace; and
4. Gluing, closing and sealing of box flaps in a gasified enclosed area.

However, the single-piece type MA package may be used for a batch-type operation in the MA packaging of produce. Alternatively, and when necessary, the single-piece type MA package system may have gas inlet and gas outlet apertures in the two end panels for gasification of the produce headspace in a completely closed MA package system (including glued, sealed flaps). Upon the insertion of a gas nozzle into the inlet aperture and upon the flow of a pressurized gas mixture through the headspace of the package system, plugs such as gas-impermeable plastic thimble plugs or styrofoam plugs would be used for produce with high respiration rats and thimble plugs would be used for low respiration rate produce.

Also, the two-piece type MA package system is intended to be used on a continuous-flow produce line consisting of:

1. A gluing, folding and pressing operation to create an open box with flanges (or protecting rims) at the top;
2. The filling of the open box with produce;
3. Gasification of produce headspace; and
4. Positioning and dropping lid onto glued flanges (or projecting rims) in a gasified enclosed area and the pressing of the glued flange-lid regions.

However, the two-piece type MA package may be used for a batch-type operation in the MA packaging of produce. Alternatively, and when necessary, the two-piece type package system may have gas inlet and gas outlet apertures in the two end panels for gasification of the produce headspace in a completely closed MA package system (including the glued-on lid). Upon the insertion of a gas nozzle into the inlet aperture and upon the flow of a pressurized gas mixture through the headspace of the package system, plugs such as gas-impermeable plastic thimble plugs or styrofoam plugs are to be inserted. Styrofoam plugs would be used for produce with high respiration rate produce.

The single-piece type and two piece type MA package systems have the same main body die-cut and plurality of folds, but the two-piece type possesses four flanges at the top of the folded open box whereas the single-piece type has flaps at the tops of the two sides of the folded open box, instead of two flanges, but the tops of the two end panels do indeed possess flanges. More simply, the only difference between the single-piece type MA package system and two-piece type MA package system is the presence of two flaps at the tops of the side walls of the folded open box instead of the presence of two flanges at the tops of the side walls of the folded open box, respectively.

The selection of either the single-piece type or the two-piece type will depend upon:

1. Unit cost with respect to the amount of waste paperboard in the die-cutting operation and the number of die-cutting operations per unit package system;
2. The complexity of the closing operation (folding-sealing in the case of the single-piece type vs. lid positionary-sealing in the case of the two-piece type);
3. Adaptability to the gasification operation;
4. Strength of the closed package system (resistance to stock compression); and
5. Ease of handling, stacking and pelletizing.

FIG. 1 illustrates a cross-sectional end view of one embodiment of the plastic/paper liner corrugated paperboard packaging material 2. The paperboard 2 has a sandwich construction comprising a kraft paper outer liner 5, an intermediate polymer film layer 6, an inner kraft paper liner 4, a corrugated draft paper flute 8, and a kraft paper inner liner 10. In this combination, the air permeability of the polymer film 6 can be selected to provide an equilibrium between the modified atmosphere (MA) gas and vapour that is contained in the interior of the package, with the outside ambient air comprising gas and vapour.

Figure 2:
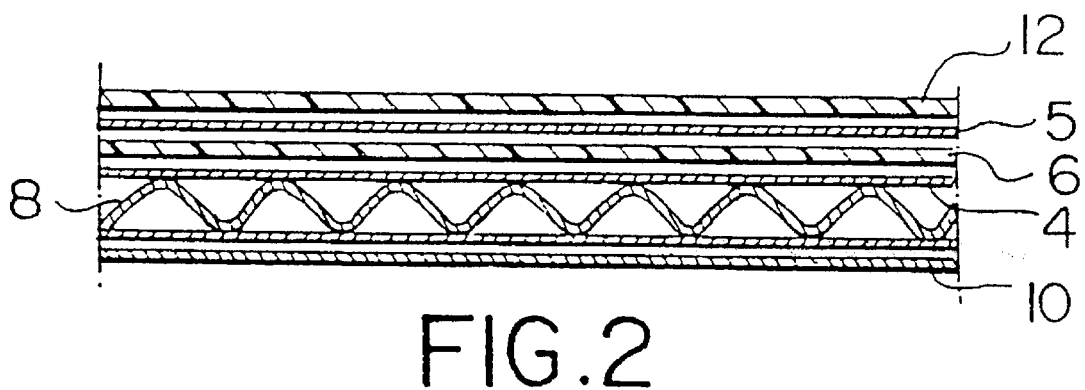
FIG. 2 illustrates a cross-sectional end view of an alternative embodiment of plastic/paper liner-corrugated paperboard package material.

FIG. 2 illustrates a cross-sectional end view of an alternative embodiment of plastic/paper liner-corrugated paperboard package material 2, which has a double thickness of polymer film. The construction is similar to that illustrated in FIG. 1 above, except that a second polymer film layer 12 is positioned on the outside of outer kraft paper liner 5. The second polymer film 12 provides an additional moisture barrier, and in combination with inner polymer film 6, provides an equilibrium between transmission rates of the modified atmosphere packaging gas and vapour, and the ambient air outside the package. The polymeric composition of polymer film 6 and second polymer film 12 can be the same or different, as required to provide the specific characteristics required for the modified atmosphere package. It is understood that the polymer film 6 in FIG. 1, and the polymer film 6 and second polymer film 12 combination illustrated in FIG. 2, are positioned on the interior of the package holding the fruit or vegetables, that is, on the modified atmosphere side of the modified atmosphere package.

Figure 3:
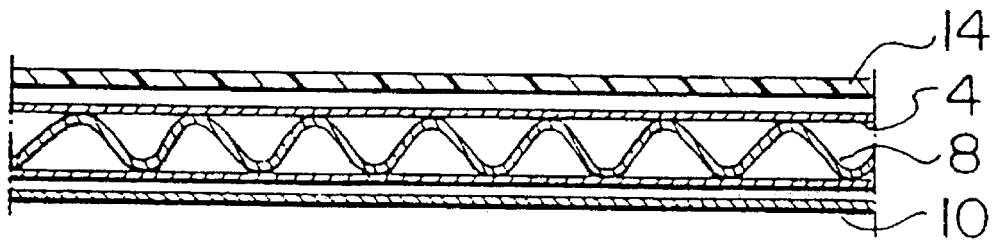
FIG. 3 illustrates a cross-sectional end view of a second alternative embodiment of plastic/paper liner-corrugated paperboard package material.

FIG. 3 illustrates a cross-sectional end view of a second alternative embodiment of plastic/paperline-corrugated paperboard, wherein only one kraft paper liner 4 is utilized, along with corrugated flute 8, and kraft inner liner 10. The polymeric layer 14 on the interior surface of the kraft paper liner 4 can be either a preformed polymer film or a coating. As with the polymer films used in the constructions illustrated in FIG. 1 and FIG. 2 respectively, the polymer film or coating 14 is selected to be of a polymeric material which has desired moisture vapour and gas transmission rates in order to achieve a balance between the modified atmosphere in the interior of the container and the ambient air outside the container.

Figure 4:
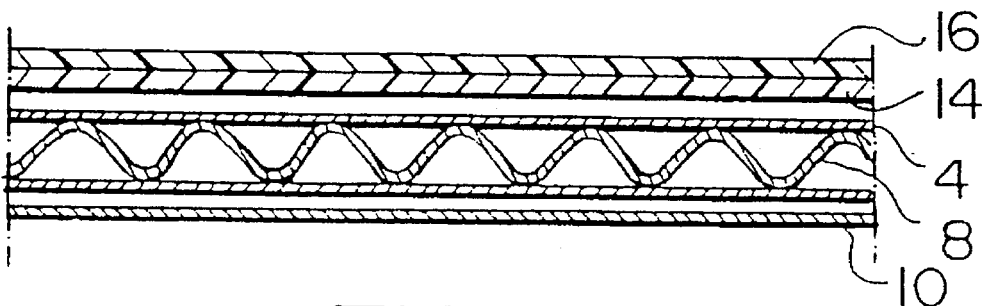
FIG. 4 illustrates a cross-sectional end view of a third alternative embodiment of the plastic coated paper liner corrugated paperboard package material.

FIG. 4 illustrates a cross-sectional end view of a third alternative embodiment of the plastic-coated paper liner corrugated paperboard package material 2, which is constructed to have a first layer of polymeric coating 14, and a second inner layer of polymeric coating 16. Alternatively, layers 14 and 16 can be polymer films. In certain situations, it may be found that a combination of two coatings 14 and 16 are necessary in order to achieve desired equilibrium gas and vapour transmission rates. It will be understood that the polymeric composition of coatings 14 and 16 may be the same or different, as required, in order to provide appropriate desired gas transmission rates. Further layers of polymer film or coatings can be added as required to achieve required vapour and gas transmission rates.

Figure 5:
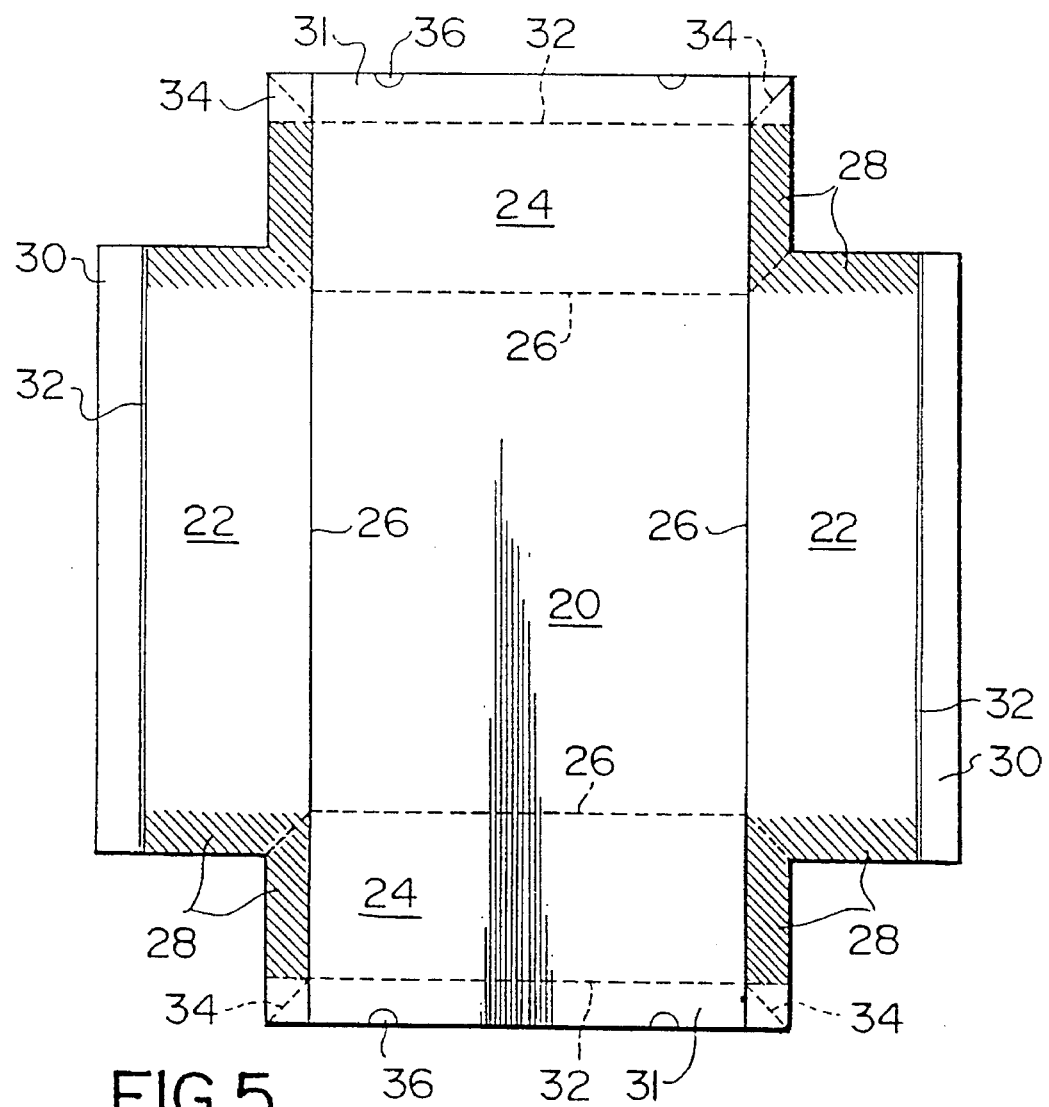
FIG. 5 illustrates a plan view of the flat unfolded die-cut body of a two-piece type modified atmosphere (MA) package system with a plurality of fold lines and cross-hatching indicating glue-applied areas.

FIG. 5 shows a plan view of the die-cut package body 20 of the two-piece type MA package system with dotted lines 26 and 32 indicating the fold lines. The cross-hatched regions 28 on the body represent the glue-applied areas.

AS illustrated in FIG. 5, the die-cut package body 20 is constructed to have a pair of side flaps 22, a pair of end flaps 24, connected to the body base 20 by main flap fold lines 26. FIG. 5 also illustrates overlapping glue areas 28 on the regions adjacent to the notched corners between end flaps 24 and side flaps 22.

The two side flaps 22 have at the ends thereof remote from the body 20 respective lid engaging side flanges 30. Similarly, the respective end flaps 24 have lid engaging end flanges 31 at the exterior sides thereof. Fold lines 32 are embossed between the respective side flaps 22 and lid engaging side flanges 30, and respective end flaps 24, and lid engaging end flanges 31. Corner fold lines 34 are also formed or embossed in the exterior corners of the respective end flaps 24.

For the folding and pressing of the single-piece and two-piece types, a metal template with a metal plate plunger can be used to produce the open package systems (boxes). The folding operation involves the placement of the central area (base 20 of package system) of the die-cut boxes over the opening of the template, the lowering of the plate plunger onto the central area at the fold lines and the application of pressure onto the plate plunger to shape the package system box) by folding the flaps and flanges of the corrugated paperboard at the fold lines.

Figure 6:
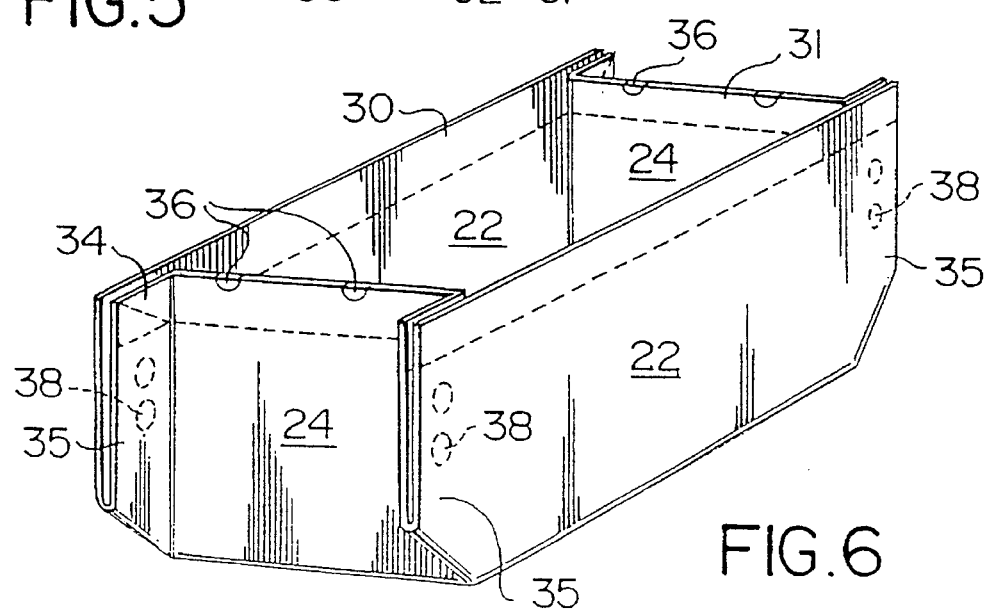
FIG. 6 illustrates an isometric view of the folded die-cut body of a two piece type MA package system in initial erected orientation.

Glue areas 28 as shown in FIG. 5 do not illustrate vent holes 38 (see FIG. 6). Glue areas 28 are pressed together during the template operation and corners 34 are embossed at the die-cut and folded to provide smooth, airtight connections.

FIG. 6 illustrates an isometric view of the folded die-cut body of a two-piece type MA package system in initial erected orientation. As can be seen in FIG. 6, the pair of side flaps 22, and the pair of end flaps 24 have been erected to a vertical position to form a rectangular enclosure around base 20 (not visible in FIG. 6). In this orientation, the four overlapping corner glue areas 28 (not visible) have met in order to form the box-like configuration. The erected lid engaging end flanges 31 have formed in the top edges thereof vent notches 36. As also illustrated in FIG. 6, the visible exterior of the overlapping glue areas 28 form four respective end columns 35, which extend longitudinally and parallel from the four corner ends of the erected structure. FIG. 6 also illustrates vent holes 38 which are formed in each of the respective columns 35. The four columns 35 provide constructional support to the overall MA package, and enable these packages to be stacked one above another. In addition, the end columns 35 provide air channels between the ends of adjacent packages, when they are stacked adjacent to one another. This is important because the columns 35 and the vent notches 36 permit equilibrium levels between ambient air and the modified atmosphere in the interior of the package to be maintained. Similarly, the vent holes 38 in the columns 35 enable ambient air to transfer readily between packages stacked laterally.

Figure 7:
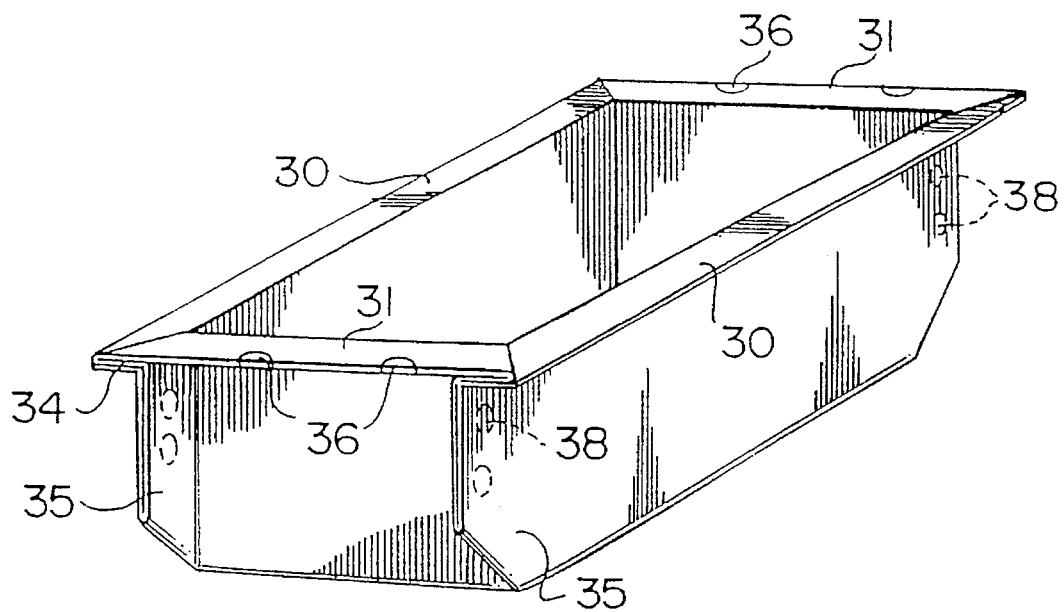
FIG. 7 illustrates an isometric view of the folded die-cut body of a two-piece type MA package system in erected orientation, with the top four flanges of the package folded outwardly to a horizontal orientation.

FIG. 7 illustrates an isometric view of the folded die-cut body of a two-piece type MA package system in erected orientation, with the top four flanges 30 and 31 of the package folded downwardly to a horizontal orientation. FIG. 7 illustrates the second step of the carton erecting process whereby the pair of lid engaging side flanges 30, and the pair of lid engaging end flanges 31 have been folded outwardly to a horizontal position. In order to do this, the corner fold lines 34 have been folded so that they overlap, thereby enabling the horizontal side flanges 30 and horizontal end flanges 31 to form a rectangular frame around the top region of the box-like package.

Figure 8:
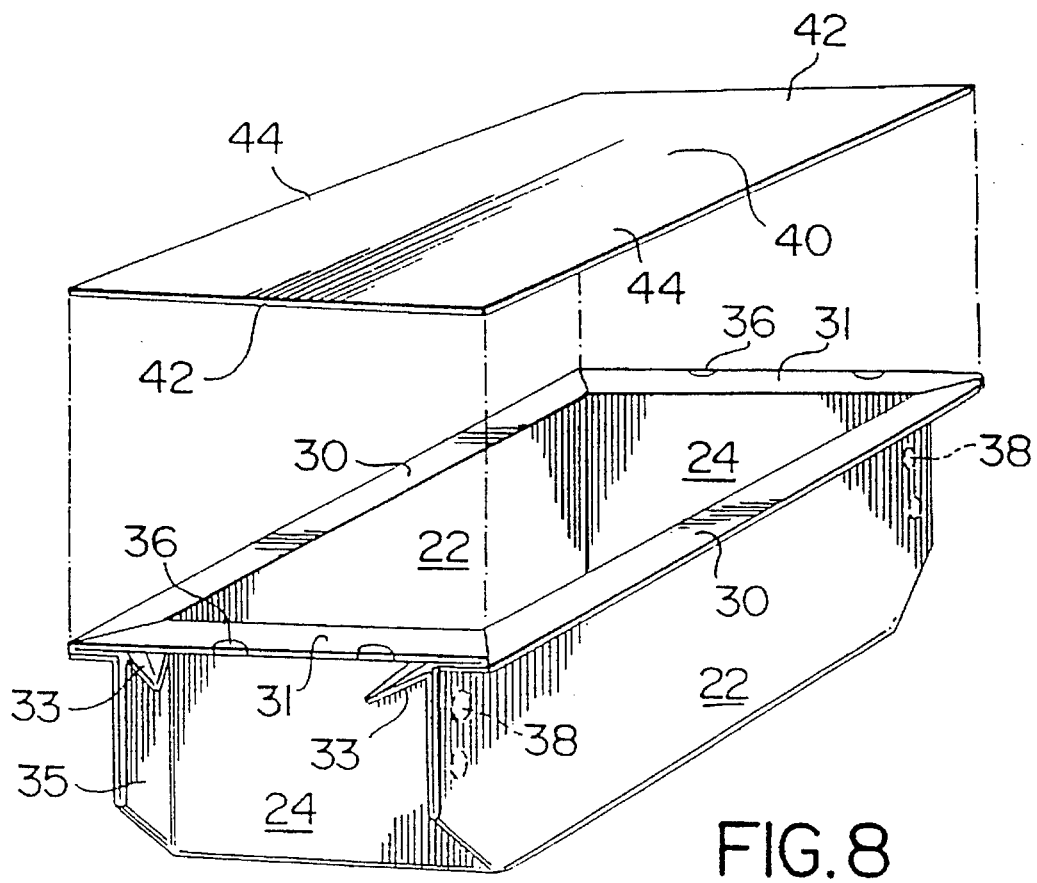
FIG. 8 illustrates an isometric view of the folded die-cut body and lid of a two-piece type MA package system in erected orientation, with horizontal folded flanges, and the rectangular lid juxtapositioned above the horizontal flanges.

FIG. 8 illustrates an isometric view of the folded die-cut body and lid of a two-piece type MA package system in erected orientation, with horizontal folded flanges 30 and 31, and a rectangular lid 40 juxtapositioned above the horizontal flanges. As seen in FIG. 8, the lid 40 is rectangular-shaped, and is sized to conform with the exterior dimensions of horizontal side flanges 30 and horizontal end flanges 31 of the main container. The lid 40 can be formed of the same coating/corrugated paperboard construction as the main box-like part of the package, according to any of the constructions illustrated in FIGS. 1, 2, 3 and 4. This ensures that the vapour and gas transmission rates through the lid 40 are the same as the gas transmission lids through the sidewalls 22 and the end walls 24, and the base 20, of the main box-like package. If desired, however, the lid 40 can be construction simply of one or more layers of kraft paper cardboard and one or more layers of polymer film or coating. Generally, the cross-sectional construction of the lid 40 would correspond with the cross-sectional construction of the walls 22 and 24 and base 20 of the main package body. The lid ends 42, and the lid sides 44, on the underside, have glue applied thereto to provide a tight seal when the lid 40 is lowered and pressed onto the flanges 30 and 31 of the main package body. The glue can be either a hot melt glue or a cold melt glue, which can be cured either by heating or supersonic sound, when pressing the lid 40 against the flanges 30 and 31. All of this can be formed on an assembly line which is adapted to handle a plurality of packages.

FIG. 8 illustrates an important feature about fold lines 34 (FIG. 5). If the corners of the end flange 31 are simply folded over the side flanges 30, at the overlapping areas, there is a "step" formed on the top surface between the two at each corner. Extra glue is required to fill these steps and achieve a tight seal. To reduce or eliminate the "step" at each corner, a portion of the layers of paper of the folded areas 34 can be separated and folded downwardly to form respective tongues 33 which can be glued against the columns 35. When the tongues 33 are formed, the thickness of the overlap at folded areas 34 is reduced and less glue is required to ensure a good seal.

Figure 9:
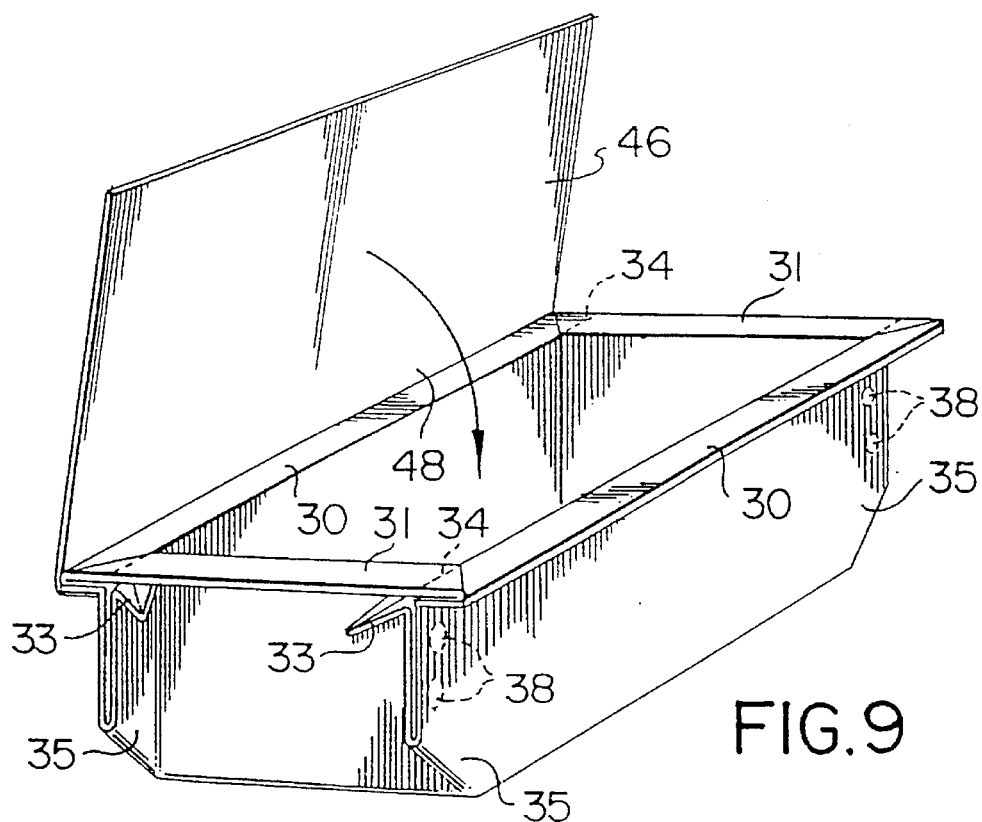
FIG. 9 illustrates an isometric view of an alternative embodiment of the folded die-cut body and lid of a single-type piece MA package system in erected orientation, with the top four flanges of the package folded horizontally, and a lid pivotally attached to one side of one of the horizontal edges.

FIG. 9 illustrates an isometric view of an alternative embodiment of the folded die-cut body of a single-type piece MA package system in erected orientation, with the top four flanges 30 and 31 of the package folded horizontally, and a lid 46 pivotally attached to one side of one of the horizontal flanges 30. In order to construct the package illustrated in FIG. 9, the die-cut package body is constructed so that it has on one side thereof an additional integrated piece which forms integrated lid 46, when folded as illustrated in FIG. 9. In certain situations, the integrated lid 46 may be preferred to having a separate rectangular lid 40 as discussed previously in connection with FIG. 8. The underside of the integrated lid 46 is glued to the respective side flanges 30 and end flanges 31, in the same manner as discussed previously in association with FIG. 8.

Figure 10:
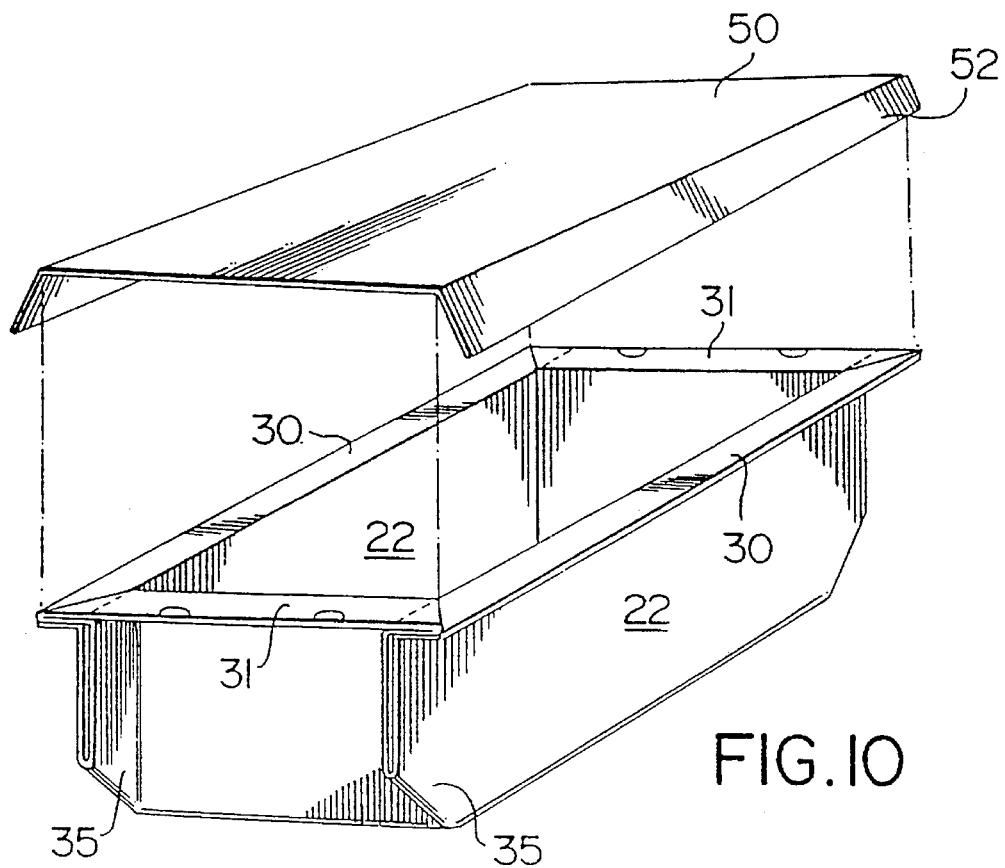
FIG. 10 illustrates an isometric vie of the folded die-cut body and lid of a two-piece type MA package system in erected orientation, with horizontal folded flanges, and a lid with downwardly folded side flaps juxtapositioned above the erected package.

FIG. 10 illustrates an isometric view of the folded die-cut body of a two-piece type MA package system in erected orientation, with horizontal folded flanges 30 and 31 and a lid 50 with downwardly folded side edges 52 juxtapositioned above the erected package. The lid 50 illustrated in FIG. 10 is a variation on the lid 40, which was discussed previously in association with FIG. 8. The lid 50 illustrated in FIG. 10 is constructed to have a pair of folding side flaps 52 on the longitudinal sides of the lid 50. These side flaps 52 fold downwardly as indicated in FIG. 10. As discussed previously, glue is applied to the underside of the lid 50 in the areas that contact side flanges 30 and end flanges 31 of the main body of the package. The lid 50 is then lowered and pressed onto the side flanges 30 and end flanges 31 and a tight seal is formed. Then, the side flaps 52 of lid 50 are folded downwardly and subsequently underneath the respective lid engaging side flanges 30. The undersides of the side flaps 52 also have glue applied to them. Once the respective side flaps 52 are folded underneath respective lid engaging side flanges 30 of the main package body, then the combination can be folded downwardly along the respective sides 22, in order to provide a finished appearance to the side walls 22. The type of lid 50 illustrated in FIG. 10 can be used in situations where extra strength, and extra sealing ability is required along the sides of the container. The end regions of the lid 50 and the end flanges 31 remain extended in a horizontal position between the end columns 35.

Figure 11:
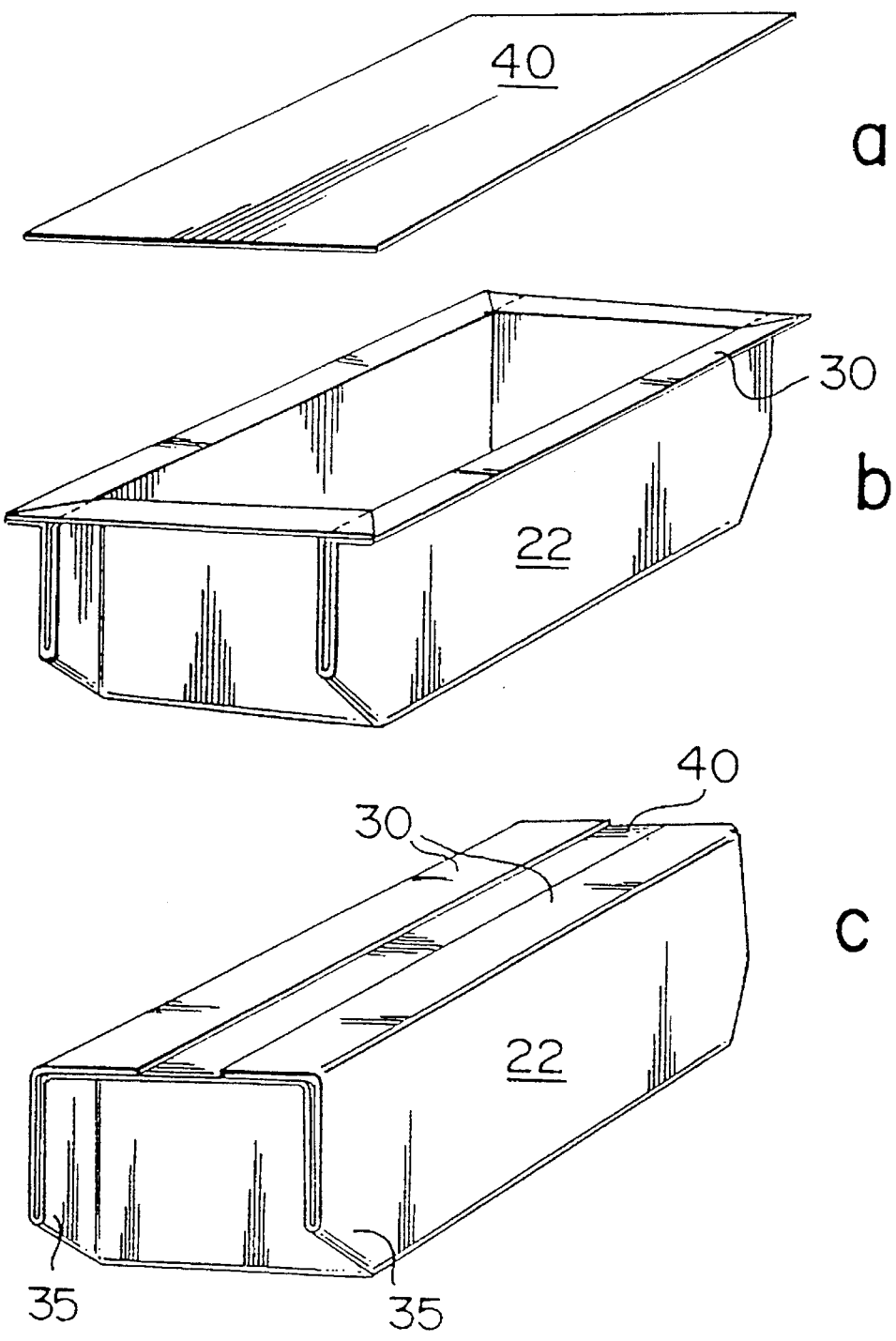

FIGS. 11a and 11b illustrate an isometric view of an erected die-cut package body, with a rectangular lid 40 juxtapostioned above the body, while FIG. 11c illustrates the lid 40 placed directly upon the erected package body, and the longitudinal flanges 30 of the erected body being folded over the lid 40. The construction shown in FIG. 11 is similar to that illustrated and discussed previously in association with FIG. 8, except that as indicated in FIG. 11c, the pair of side flanges 30 are folded upwardly and inwardly so that they lie on the top side of the lid 40. They are glued in that position to provide a strengthened neat top surface for the MA package. This configuration is also useful in providing additional strength to the top region of the container. It will be understood that the width of the lid 40 and the widths of side flanges 30 can be adjusted so that when flanges 30 are folded inwardly over lid 40, they extend across the entire upper surface of lid 40. In other words, the exterior ends of flanges 30 meet and lid 40 is completely covered.

Figure 12:
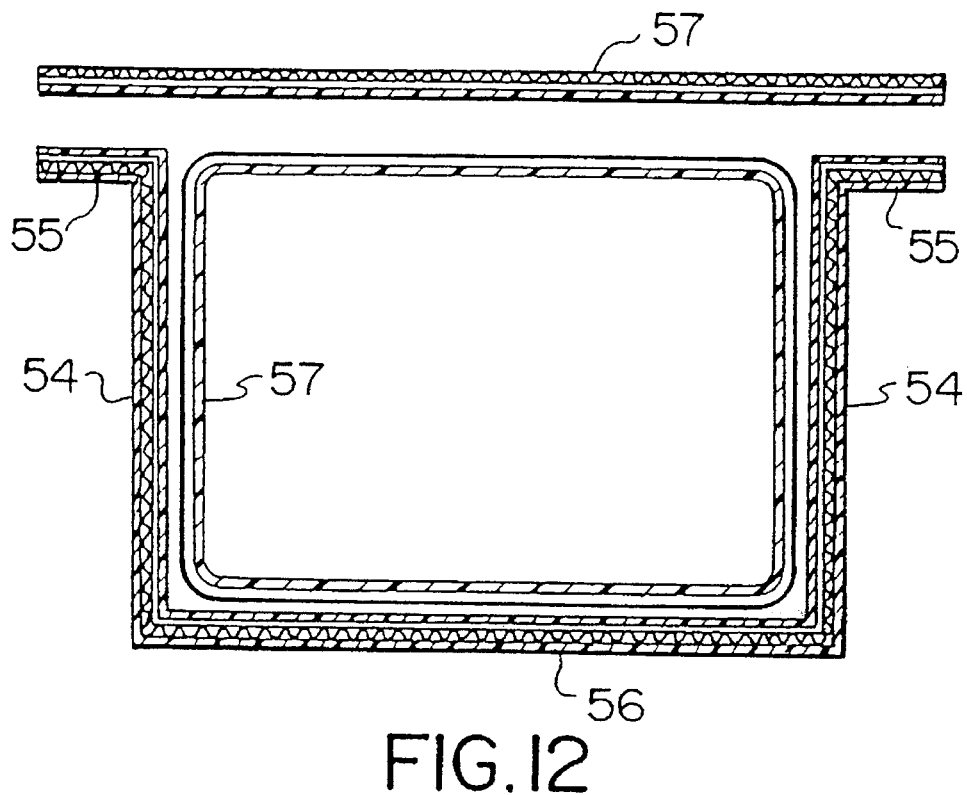
FIG. 12 illustrates an end section view of an erected folded die-cut body and separate inner liner and lid of an alternative triple-piece type MA package system.

FIG. 12 illustrates an end section view of an erected folded die-cut body, a separate lid and a separate liner, of an alternative three-piece type MA package system. This configuration provides double layer side walls, lid and base. As seen in FIG. 12, the main package body has corrugated paper-polymer film side walls 54, horizontal flanges 55 and base 56. A corrugated paper-polymer film lid 57 fits over the base 56, side walls 54 and flanges 55. A separate enclosed paper liner-film bag enclosure 57 fits inside the side walls 54 and base 56. This construction is useful where greater vapour and gas transmission barriers are required, or it is convenient to first package the fruit or vegetables in the bag 57 and then place the bag in the corrugated paper-liner box. The lid 57 can be formed of corrugated paperboard material to correspond with the construction material from which the main body of the carton is formed, or it can be simply a paper liner-film liner combination. In another variation, the bag 57 as illustrated in FIG. 12 can be semi-detachable by being spot welded to the interior of the main package body. In certain situations, it may be advantageous to have a separate polymeric liner, either free, semi-detached or attached, in addition to the main polymer liner/kraft paper combination forming the main body of the carton.

Figure 13:
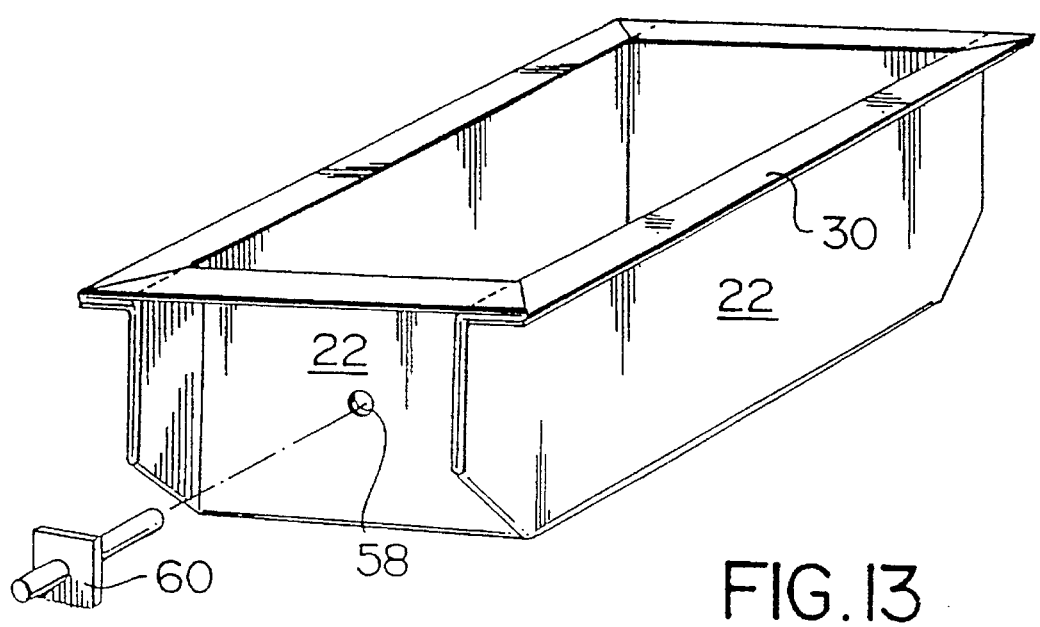
FIG. 13 illustrates an exploded isometric view of an erected folded die-cut body of a two-piece type MA package with an atmosphere transferring valve for insertion in an end wall of the body.

FIG. 13 illustrates an exploded isometric view of an erected folded die-cut body of a two-piece type MA package with an atmosphere transferring valve 60 for insertion in a hole 58 in the end wall of the package. The package illustrated in FIG. 13 has formed in the end wall 22 a valve hole 58, in which can be inserted a valve 60. The valve 60 can be useful in order to increase vapour and gas permeability between the ambient air and the modified atmosphere in the interior of the package. Suitable valve materials are discussed elsewhere in this disclosure.

The barrier material used is polyethylene or acrylate polymers. These polymers can be in the form of a film or a melted liquid plastic. When polyethylene is applied, with 15–35 g/sq. meter of paper base, oxygen permeability of 800–28,000 is achieved. The permeability was measured by Oy Keskuslaboratorio Centrallaboratorio Ab, Helsinki, Finland, at 23° C. The designed box breathes through the bottom 20 of the box due to the corrugated construction (ventilation in the flutes).

EXAMPLE 1

Fresh, disease-free, broccoli pieces (florets with stems) at the desirable maturity stage of compact, tightly-folded, deep green-coloured flower buds, were selected. The florets were cut from the main stems of the broccoli with a sharp knife and then washed in an aqueous chlorine solution (100 ppm free chlorine) for about 3 minutes. After removing the loosely-adhering solution drops from the florets, they were subjected to high-velocity air to remove solution droplets and adsorbed solution from the floret surfaces. The surface dried broccoli florets were packed into lined MAP boxes, each with dimensions of about 34 cm long, 29 cm wide and 11 cm high. The polymer-paper liner attached to the paperboard consisted of polyethylene film laminated to kraft paper (see film layer 6 and paper layer 5 in FIG. 1.) The $O_2$ permeability value for the polymer-paper liner was determined to be 20,000–22,000 mL/sq. meter/24 hr./25° C.

Each box was sealed after the headspace was flushed with a gas mixture consisting of about 5% $CO_2$, 18% $O_2$ and 87% inert gases, $N_2$ being the major inert gas. The sealed, flushed boxes were stored at 2°–2° C. for periods up to 6 weeks. Periodically, the gas composition of the headspace of each box was determined by gas chromatography, and raw broccoli florets from randomly selected boxes were assessed by a sensory panel for colour, odor, flavour, texture and overall acceptability every week for 6 weeks.

No microbial spoilage was evident visually in the stored fresh broccoli florets and no sulfur-like order could be detected by the sniff test in the just-opened boxes for storage times up to 6 weeks.

Visual and sensory ratings of unstored and stored (under MA conditions) broccoli florets are presented in Table 1. The colour, odor, flavour and texture of the unstored, fresh broccoli florets were rated excellent by panel members. Thus unstored fresh broccoli florets were considered to be the highest quality reference product, and all of the quality attributes for the unstored broccoli florets were assigned rating values of 5. An explanation of rating values below 5 (excellent) is presented in the footnote of Table 1.

As shown in Table 1, all of the quality attributes of stored broccoli florets were rated 5 (excellent) for storage periods up to 4 weeks. At the fifth week of storage of broccoli florets, the ratings for colour, odor and overall acceptability dropped from 5 (excellent) to 4 (good, but the flavour and texture were still rated as excellent with a value of 5.

stem sprouts were packed into lined MAP boxes, each with dimensions of about 34 cm long 29 cm wide and 11 high. The polymer-paper liner attached to the paperboard consisted of polyethylene film laminated to kraft paper (see film layer 6 and paper layer 5 in FIG. 1.) The oxygen permeability value for the polymer-paper liner was determined to be 25,000 ml/sq. meter/24 hr./25° C.

Each box was sealed after the headspace was flushed with a gas mixture consisting of about 5% $CO_2$, 19% $O_2$ and 86% inert gases, $N_2$ being the major inert gas. The sealed, flushed boxes were stored at 2°–3° C. for periods up to 4 weeks. Periodically, the gas composition of the space of each box was determined by gas chromatography, and raw asparagus stem sprouts from randomly selected boxes were assessed by a sensory panel for colour, odor, flavour, texture and overall acceptability, every week for 4 weeks.

No microbial spoilage was evident visually in the stored fresh asparagus stem sprouts and no off-odor could be detected by the sniff test in the just-opened boxes for storage times up to 4 weeks.

Visual and sensory ratings of unstored and stored (under MA conditions) asparagus stem sprouts are presented in Table 2. The colour, odor, flavour and texture of the unstored, fresh asparagus stem sprouts were rated excellent by panel members. The unstored fresh asparagus stem sprouts were considered to be the highest quality reference

TABLE 1

| | Broccoli Florets (Stored at 2–3° C. Under MA Conditions) | | | | |
|---|---|---|---|---|---|
| STORAGE TIME | QUALITY RATING[1] | | | | OVERALL |
| (Weeks) | Colour | Odour | Flavour | Textrue | ACCEPTABILITY |
| Unstored | 5 | 5 | 5 | 5 | 5 |
| 1 | 5 | 5 | 5 | 5 | 5 |
| 2 | 5 | 5 | 5 | 5 | 5 |
| 3 | 5 | 5 | 5 | 5 | 5 |
| 4 | 5 | 5 | 5 | 5 | 5 |
| 5 | 4 | 4 | 5 | 5 | 4 |
| 6 | 3.5 | 4 | 5 | 5 | 3.5 |

[1]RATING: 5 = Excellent; 4 = Good; 3 = Fair; 2 = Marginal; 1 = Poor & Unacceptable

EXAMPLE 2

Fresh, disease-free asparagus stem sprouts (overall stem length of about 6 inches) at the maturity stage of a well-closed sprout head and minimal vascular fibres in the stem, were selected. The asparagus stem sprouts were washed in an aqueous chlorine solution (300 ppm free chlorine) for 3 minutes and then washed in water. After removing the loosely-adhering water drops, the asparagus stem sprouts were subjected to high-velocity air to remove the water droplets and adsorbed water from the surfaces of the asparagus sprout and stem portions. The surface-dried asparagus product, and all of the quality attributes evaluated by the sensory panel were assigned rating values of 5. The meanings of rating values below 5 are presented in the footnote of Table 2.

As shown in Table 2, all of the quality attributes of stored asparagus stem sprouts were rated 5 (excellent for storage periods up to 2 weeks. At the third week of storage of asparagus stem sprouts, the ratings for colour, odor and texture were 5 (excellent) whereas the ratings for flavour and overall acceptability dropped slightly to 4.5. Even at the fourth week of storage of asparagus stem sprouts, the ratings were at least 4, indicating good quality.

TABLE 2

| | Asparagus Stem Sprouts (Stored at 2–3° C. Under MA Conditions) | | | | |
|---|---|---|---|---|---|
| STORAGE TIME | QUALITY RATING[1] | | | | OVERALL |
| (Weeks) | Colour | Odour | Flavour | Textrue | ACCEPTABILITY |
| Unstored | 5 | 5 | 5 | 5 | 5 |
| 1 | 5 | 5 | 5 | 5 | 5 |

TABLE 2-continued

Asparagus Stem Sprouts
(Stored at 2–3° C. Under MA Conditions)

| STORAGE TIME | QUALITY RATING[1] | | | | OVERALL |
|---|---|---|---|---|---|
| (Weeks) | Colour | Odour | Flavour | Textrue | ACCEPTABILITY |
| 2 | 5 | 5 | 5 | 5 | 5 |
| 3 | 5 | 5 | 4.5 | 5 | 4.5 |
| 4 | 5 | 4 | 4.5 | 4.5 | 4 |

[1]RATING: 5 = Excellent; 4 = Good; 3 = Fair; 2 = Marginal; 1 = Poor & Unacceptable

EXAMPLE 3

Fresh, disease-free, white, partially open, ready-to-use pine mushrooms were selected. The surfaces of the pine mushrooms were dry and free of soil. The pine mushrooms were packed into lined MAP boxes, each with dimensions of about 34 cm long, 29 cm wide and 11 cm high. The polymer-paper liner on the paperboard was made up of polyethylene film laminated to kraft paper (see film layer 6 and paper layer 5 in FIG. 1.) The $O_2$ permeability value for the polymer-paper liner was determined to be about 28,000 ml/sq. meter/24 hr./25° C.

Each box was sealed, after the headspace was flushed with a gas mixture consisting of about 10% $Co_2$, 18% $O_2$ and 87% inert gases, $N_2$ being the major inert gas. The sealed, flushed boxes were stored at 2°–3° C. for periods up to 4 weeks.

No microbial slime was evident on the surfaces of the pine mushrooms after a storage period of 4 weeks.

Visual and sensory ratings of unstored and stored (under MA conditions) pine mushrooms are presented in Table 3. The colour, odor, flavour and texture of the unstored pine mushrooms were rated as excellent by panel members. Thus, the unstored, fresh pine mushrooms were considered to be the highest quality reference product, and all of the quality attributes for the unstored pine mushrooms were assigned rating values of 5 (excellent). The meaning of rating values below 5 (excellent) are presented in the footnote of Table 3.

Table 3 indicates that all of the quality attributes of stored pine mushrooms were rated 5 (excellent) for storage periods up to 2 weeks. At the third week of storage, the pine mushrooms were slightly brown and assigned a rating of 4 (good). All of the other quality attributes were rated as 5 (excellent). Upon storage of pine mushrooms for 4 weeks, the colour and texture were rated as 4 (good) and the odor and flavour retained their rating of 5 (excellent).

TABLE 3

Pine Mushrooms
(Stored at 2–3° C. Under MA Conditions)

| STORAGE TIME | QUALITY RATING[1] | | | |
|---|---|---|---|---|
| (Weeks) | Colour | Odour | Flavour | Texture |
| Unstored | 5 | 5 | 5 | 5 |
| 1 | 5 | 5 | 5 | 5 |
| 2 | 5 | 5 | 5 | 5 |
| 3 | 4 | 5 | 5 | 5 |
| 4 | 4 | 5 | 5 | 4 |

[1]RATING: 5 = Excellent; 4 = Good; 3 = Fair; 2 = Marginal; 1 = Poor & Unacceptable

EXAMPLE 4

Fresh, disease-free, tight-budded carnations with stems lengths of 20–24 inches, were selected. The buds and stems were dry to the touch. The bud carnations were packed into lined MAP boxes, each with dimensions of about 75 cm long, 19 cm wide and 12 cm high. Each box contained about 100 bud carnations. The polymer-paper liner attached to the paperboard consisted of polyethylene film laminated to kraft paper (see film layer 6 and paper layer 5 in FIG. 1.) The $O_2$ permeability value for the polymer-paper liner was measured to be about 28,000 ml/sq. meter/24 hr./25° C.

Each box was sealed, after the headspace was flushed with a gas mixture consisting of about 5% $CO_2$, 15% $O_2$ and 80% inert gases, $N_2$ being the major inert gas. The sealed, flushed boxes were stored at 2°–3° C. for periods up to 4 weeks. Periodically, the gas composition of the headspace of each box was measured by gas chromatography. Boxes were randomly selected to assess the green colour of the bud, the conformational features of the flowered carnation, and the quality endurance time of the flavoured carnations held in water at about 20° C.

At storage times of 1, 2 and 4 weeks, bud carnations were removed from the boxes and each stem was cut, about one inch from the bottom, prior to insertion into a container of water. All the buds of the carnations expanded into full-bloom flowers (flowered carnations) during a holding period of about 2 days in the water at about 20° C. The stems of the flowered carnations were further held in water at an ambient temperature of about 20° C. for the determination of quality endurance times.

As shown in Table 4, the green bud colour of all of the carnations held for periods up to 4 weeks in the sealed MAP boxes was rated excellent with a value of 5. No mottling or brown discolouration was noted on the bud surfaces. The conformational features of the flowered carnations were rated as excellent with a value of 5 for all bud carnations held at 2°–3° C. for periods up to 4 weeks (Table 4). Table 4 shows that the quality endurance times (number of days that the flowers endured) at ambient temperature with acceptable flower quality) was between 10 and 14 days for all storage periods of the bud carnations.

TABLE 4

Bud Carnations
(Stored at 2–3° C. Under MA Conditions)

| STORAGE | QUALITY RATING[1] | | QUALITY |
|---|---|---|---|
| TIME (Weeks) | Bud Colour | Conformational Features | ENDURANCE TIME (Days) |
| Unstored | 5 | 5 | 10–14 |
| 1 | 5 | 5 | 10–14 |
| 2 | 5 | 5 | 10–14 |
| 4 | 5 | 5 | 10–14 |

[1]RATING: 5 = Excellent; 4 = Good; 3 = Fair; 2 = Marginal; 1 = Poor and Unacceptable

We claim:

1. A modified atmosphere box or carton for packaging and extending the freshness of fresh produce comprising a sandwich-type plastic-paperboard complexity comprising in sequence from the interior to the exterior:
    (a) a first layer of polymeric film;
    (b) a second layer of kraft paper adjacent the first layer;
    (c) a third layer of kraft paper corrugated flute adjacent the second layer; and
    (d) a fourth layer of kraft paper adjacent the third layer;
    wherein the body of the box or carton is constructed of a complexity comprising:
        (i) a rectangular base;
        (ii) a first rectangular side flap on one side of the base joined to the side of the base by a fold line;
        (iii) a first rectangular flange joined by a fold line to the first rectangular side flap on the side removed from the base;
        (iv) a second rectangular side flap on the side of the base opposite to the first flap joined to the side of the base by a fold line;
        (v) a second rectangular flange joined by a fold line to the second rectangular side flap on the side removed from the base;
        (vi) a rectangular end flap on one end of the base joined to the end of the base by a fold line;
        (vii) a first rectangular end flange joined by a fold line to the first rectangular end flap on the side removed from the body;
        (viii) a second rectangular end flap on the end of the base opposite the first end flap joined to the end of the base by a fold line;
        (ix) a second rectangular end flange joined by a fold line to the second end flap on the side removed from the body; and
        (x) fold lines formed in the exterior corners of the first and second end flanges removed from the body; said box or carton being sealed airtight at all intersections and joints, the walls of said box or carton having an oxygen permeability of about 800 to 28,000 mL/m$^2$/24 hr./25° C.

2. A box or carton as claimed in claim 1 wherein the complexity forming the walls includes (e) a layer of kraft paper inside the box or carton adjacent the layer of polymeric film.

3. A box or carton as claimed in claim 1 wherein the complexity forming the walls includes:
    (f) a layer of polymeric film; and
    (g) a layer of kraft paper between the second layer of kraft paper and the third layer of kraft paper corrugated flute.

4. A box or carton as claimed in claim 1 wherein the complexity forming the walls includes a layer of polymeric film adjacent to the exterior of the first layer of polymeric film.

5. A box or carton as claimed in claim 1 wherein the first layer of the polymeric film of the complexity is a polymeric coating.

6. A box or carton as claimed in claim 5 wherein the complexity forming the walls includes a second polymeric coating formed on the exterior of the first polymeric coating.

7. A box or carton as claimed in claim 1 wherein the body has a general cross-section shaped configuration.

8. A box or carton as claimed in claim 1 wherein at least one notch is formed in the free end of each of the first and second end flanges removed from the body.

9. A box or carton as claimed in claim 1 wherein glue is applied to the end regions of each of the first and second side flaps, and first and second end flaps to provide a tight seal.

10. A box or carton as claimed in claim 9 wherein at least one vent hole is formed in each of the glue regions, the vent holes being congruent when the glue regions are folded together.

11. A box or carton as claimed in claim 9 wherein the glue is hot melt glue.

12. A box or carton as claimed in claim 9 wherein the seal is gas-tight.

13. A box or carton as claimed in claim 1 including a lid constructed of a paperboard complexity having the first layer of polymeric film facing the interior of the box or carton, said lid being sealed air-tight to the box or carton with hot melt glue.

14. A box or carton as claimed in claim 1 including a separate liner inside the box or carton.

* * * * *